Aug. 4, 1936.　　　　G. G. EARL　　　　2,049,642

FLUID METERING SYSTEM AND APPARATUS

Filed May 6, 1933　　　　2 Sheets-Sheet 1

INVENTOR.
George G. Earl
BY
Slough + Canfield
ATTORNEYS.

Aug. 4, 1936.  G. G. EARL  2,049,642
FLUID METERING SYSTEM AND APPARATUS
Filed May 6, 1933  2 Sheets-Sheet 2

INVENTOR.
George G. Earl
BY
Slough + Caufield
ATTORNEYS.

Patented Aug. 4, 1936

2,049,642

UNITED STATES PATENT OFFICE 2,049,642

FLUID METERING SYSTEM AND APPARATUS

George Goodell Earl, New Orleans, La.

Application May 6, 1933, Serial No. 669,721

18 Claims. (Cl. 73—198)

This invention relates to liquid flow metering and recording instruments for registering or registering and recording the quantity of liquid passed through the instrument and relates particularly to such instruments adapted to accurately measure, or measure and record, flows of liquid at varying rates, including exceedingly small rates of flow.

In providing an instrument for measuring or measuring and recording accurately very small rates of flow, the problem is presented of providing also for the measurement and recording of relatively large rates of flow, which may at times occur, without impairment of the instrument accuracy.

One of the uses to which my invention is particularly applicable is the measuring or measuring and recording of rainfall occurring at any place or station during a selected period of time. Although my invention is applicable to other purposes as will become apparent hereinafter, its application to the measurement and recording of rainfall is particularly described herein as an illustrative use.

Another object of my invention is to provide an improved system and apparatus for measuring or measuring and recording, with equal accuracy, all rates of flow therethrough from a desired maximum to substantially zero.

Another object of my invention is to provide a system and apparatus of the type referred to for registering or registering and recording in an improved manner the amount of rainfall occurring in a given time period at a given point or station.

Another object is to provide an improved system and apparatus of the class referred to for measuring or measuring and recording the amount of liquid accumulated in a reservoir or the like, and flowing out therefrom, and particularly when the amount of accumulated liquid is small and the rate of flow from the reservoir is small.

Another object is to provide an improved registering and/or recording instrument of the gulper type.

Other objects of the invention will be apparent to those skilled in the art to which my invention appertains.

My invention is fully disclosed in the following description taken in connection with the accompanying drawings, in which.

Figures 1, 2, 3, 6, 7, 8, 9:
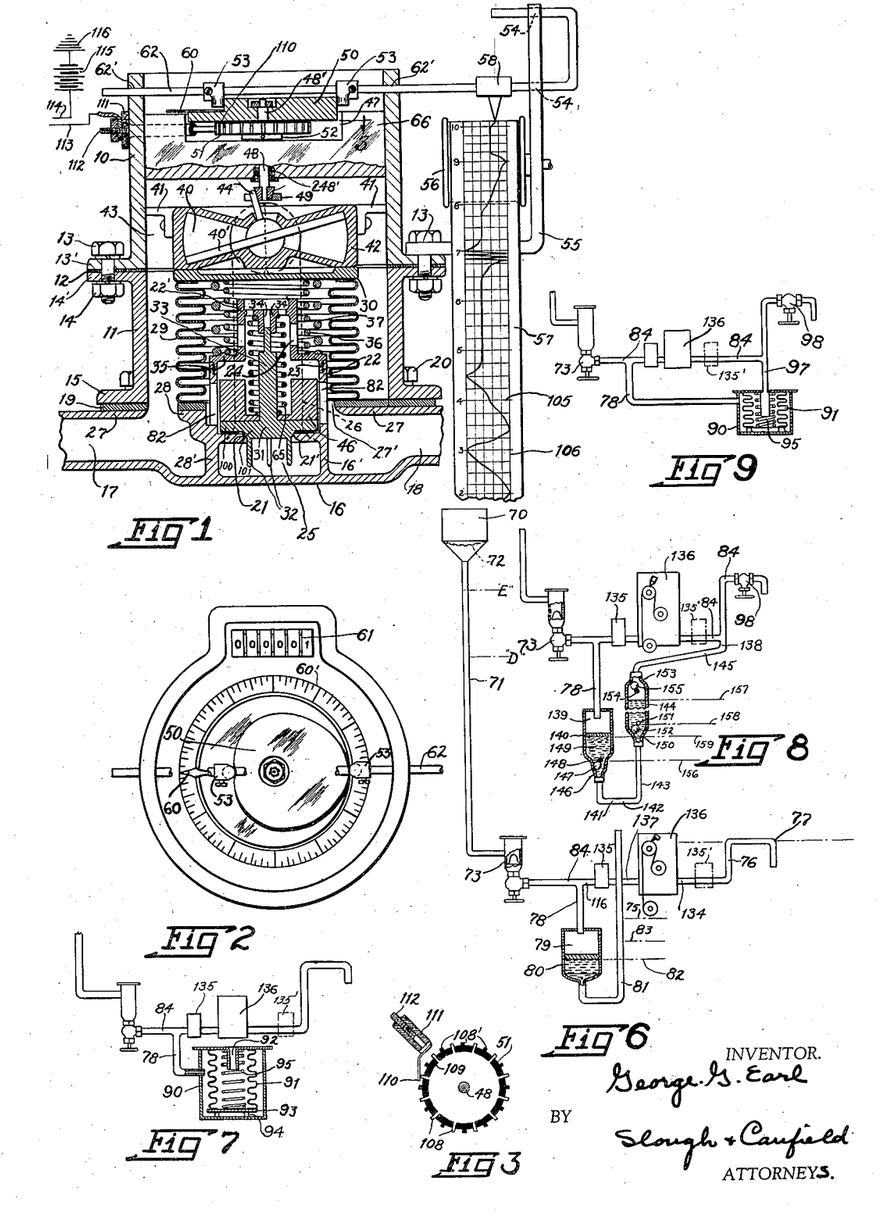
Fig. 1 is a vertical longitudinal sectional view of a flow registering and recording meter in which some of the features of my invention are embodied.
Fig. 2 is a plan view of the meter mechanism of Fig. 1 with parts omitted to simplify the drawing.
Fig. 3 is a fragmentary sectional view taken from the plane 3 of Fig. 1, with parts behind the section plane omitted for simplification.
Fig. 6 is a diagrammatic view illustrating the application of my invention to a liquid conduit system for the measurements and recording of rainfall and illustrating in simplified form the apparatus of Figs. 4 and 5.
Figs. 7, 8 and 9 are diagrammatic views generally similar to Fig. 6 illustrating other conduit systems which I may employ.

Referring to Figs. 1, 2 and 3, I have illustrated therein an improved meter mechanism for accurately registering and recording rates of liquid flow whether occurring at low rates or at high rates, from any source. Meters of this general type are illustrated in my prior Patents Numbers 1,808,209, 1,808,210, 1,808,211, and 1,808,212, all issued June 2, 1931. The development of such meters has resulted from the fact that an ordinary meter, or one having a registering mechanism adapted to be actuated by any flow of liquid therethrough, registers accurately only at certain relatively high rates of flow, and below these rates of flow registers inaccurately.

In the drawings, 10 and 11 are coaxially disposed tubular casing members having adjacent flanges 13' and 14', clamped together with a gasket 12 therebetween by bolts 13 projected through perforations in the flanges and by nuts 14 on the bolts.

The housing portion 11 is bolted to a conduit portion of the housing 16 by bolts 20 projected through perforations in a flange 15 of the portion 11, and with a gasket 19 interposed between the flange and the conduit portion. The conduit portion 16 has tubular extensions 17 and 18 extending oppositely therefrom and which may be provided with flanges or coupling means (not shown) for connecting it in a line of liquid flow.

The tubular extension 17 communicates with the interior of the cylindrical portion 11. Communication with the tubular extension 18 is cut off by a generally horizontal shelf 27 of the conduit portion 16 and by generally transverse partition 28' joining the shelf 27. A circular opening 27' is formed in the shelf 27 and is sealed by the lower end of a collapsible bellows 29, the upper end of which is sealed by a head 30. Thus the tubular conduit 17 communicates with the space around the outside of the bellows 29 and the conduit portion 16 communicates with the interior thereof through the opening 27'.

A wall 16' supplementing the wall 28' forms a chamber 25 in the conduit portion 16, the upper wall 21' of the chamber having therein a valve port 21 in and upon which, in a manner to be described, is seated a valve 31 normally closing the same. The chamber 25 communicates by a liquid conducting passageway, indicated generally in dotted lines at 26, with the discharge side of a liquid operated nutating device 40 having an actuated movable element 40', the approach side of which communicates with the conduit portion 17 or the portion 11 externally of the bellows by a passageway not shown and disposed on the side of the section plane of the drawings toward the observer and therefore not visible in the drawings.

The nutating device 40 comprises a housing 42 in which the actuated element 40' nutatively moves, and the housing 42 is secured in permanent position within the tubular housing portion 10 by brackets 41—41. Lower portions of the housing 42 constitute an upper movement limiting stop for the head 30 of the bellows when the same is expanded by means to be described. A stem 44 connected to the actuated element 40' and projecting out of the housing 42 travels generally on the surface of a cone as is well known to be the case in nutating devices of this class, and engages a head 49 on a rotatable shaft 48 to rotate the shaft by movement of the actuated element 40' when liquid flows through the nutating device 40 from the conduit extension 17 upwardly around the bellows 29 and through the space 43 surrounding the nutating device housing 42, through the device, downwardly through the passageway 26, into the chamber 25, when such flow is not stopped by closed position of the valve 31.

Above the nutating device 40 the tubular housing portion 10 is interiorly sealed by a head 66 into which the shaft 48 extends. The shaft 48 may be sealed by a packing 248. Rotations of the shaft 48 operate a registering and recording mechanism to be described.

The walls 28' and 16' of the chamber 25 extend upwardly above the valve port 21 providing a cylindrical wall 22 the diameter of which is abruptly reduced, thus providing a horizontally disposed annular shoulder 35 and a coaxial cylindrical wall extension 22'. A relatively strong compression spring 37 and a relatively weak compression spring 36 are disposed in telescoped coaxial relation and abut at one end upon the shoulder 35 and at the other end upon the head 30 of the bellows. The spring 36 may be selected for strength to provide more accurately the exact required joint spring strength of the two springs; and the spring 36 being the weaker of the two may supply only a small fraction of the joint strength whereby it may be varied considerably with only a small variation of the total strength thus giving an accurate means of adjusting the total joint spring strength. The diameter of the housing wall 22 and of the springs 36 and 37 is small enough so that these parts may be disposed coaxially within the bellows and will not be engaged by the bellows corrugations during its collapsing and expanding movements. Sufficient clearance is provided between the wall 22 and the bellows inner wall for the free passage of liquid from the interior of the bellows into the conduit extension 18.

The cylindrical wall 22 is provided with a plurality of large liquid passageways 82—82 and the reduced diameter portion 22' also preferably has passageways 24—24 therethrough to facilitate the free exchange of liquid from the interior of the housing 22—22' to the interior of the bellows.

The valve 31 above referred to comprises a disc-like body 100 having a central frusto-conical portion 101 extending into and sealing the annular port 21 in the upper wall 21' and is provided with a plurality such as three or more depending fingers 32 which may engage the periphery of the port 21 to guide the vertical movement of the valve. A stem 33 projects axially into the housing 22—22' and at its upper end is guided in a bore 34 provided in a transverse bridging portion 34' at the upper end of the wall 22'.

An annular weight 46 rests upon the valve body 100 and is centrally positioned thereon by being telescoped over the stem 33. A compression spring 65 abuts at one end upon the valve 31 or upon a portion of the weight 46 thereon and at its other end abuts upon the bridge 34'.

In the operation of the meter thus far described, the conduit extensions 17 and 18 are connected in a line of flow. Assuming that the flow is controlled by some operative means in the system to cause a low rate of flow to occur out of the conduit extension 18, such flow will reduce the pressure within the bellows 29 and upon the valve 31 within the housing wall 22—22'; whereas the pressure in the conduit extension 17 and in the space surrounding the bellows may remain at high values. The valve port 21 is maintained closed by the pressure of the springs 36 and 37 thereon and therefore as liquid is withdrawn from the conduit extension 18, the same is supplied from the liquid contained within the bellows 29 and the housing 22—22' above the valve.

As liquid continues to be withdrawn, the pressure of the liquid in the conduit extension 17 and the space around the bellows acts upon the bellows to collapse it. The head 30 is not sealed upon the housing portion 42 and the liquid pressure forces liquid between the head 30 and housing portion 42, moving the head 30 thereof downwardly, and also acts upon the valve 31 tending to move it to open the port 21. The valve, however, remains closed while the bellows head 30 moves downwardly and the tension of the springs 36—37 increases correspondingly. A condition of balance is attained just before the head 30 reaches or touches the upper end of the chamber wall 22' and at which the pressure on the valve 31 is just sufficient to move it to open the port 21 against the tension of the valve spring 65 and the spring assisting the weight 46. Any further withdrawal of water from the conduit 18 will so reduce the pressure on the upper side of the valve that the now excessive pressure on the lower side of the valve in the chamber 25, communicated thereto through the passageway 26 from the conduit extension 17, will lift the valve.

Water then rushes immediately from the conduit extension 17 through the nutating device 40 operating the actuated element 40' thereof, through the passageway 26 into the chamber 25, thence through the valve port 21, into the cylindrical chamber 22—22', thence into the interior of the bellows 29 and/or into the conduit extension 18.

If the rate of withdrawal of liquid from the conduit extension 18 is sufficiently great to maintain a sufficient excessive pressure from the conduit extension 17 on the valve, the valve will be held open and the liquid will continue to flow therethrough to supply the conduit 18. If, however, the rate of withdrawal of liquid is a sufficiently low rate, the valve will be returned to its closed position. In either case, however, the springs 36—37 will have expanded the bellows to its extended position illustrated and it will again be filled with liquid.

Thus at small rates of draft the conduit extension 18 is supplied from the interior of the bellows and chamber 22—22', and when the bellows is exhausted to a predetermined extent, the valve opens, the bellows expands to re-fill itself, and the valve immediately closes, thus performing the so-called "gulping" action. On the other hand, if the draft is sufficiently great, the valve will be opened and the conduit 18 will be supplied through the valve. In either case, liquid flows through the nutating device 40 only at a relatively rapid rate well within the zone of rate at which it can register accurately; so that no matter how low a rate of discharge occurs from the conduit extension 18, it will be registered accurately by movement of the actuated device 40' of the nutating device 40, such low rates of flow being supplied from previously stored liquid which flowed through the meter at a high rate.

In the foregoing mode of operation, liquid under pressure is continuously supplied to the conduit extension 17 and liquid is withdrawn from the conduit extension 18 under the control of a valve or like device not shown supplying the liquid at a point of use.

In another mode of operation, it may be considered that the conduit extension 18 is open to the atmosphere and liquid is supplied to the conduit extension 17 under a gradually increasing pressure such as would occur where a rainfall was slowly collected in a stand pipe connected to the conduit extension 17. In this mode of operation, the accumulated liquid in the conduit extension 17 is stopped from flowing through the meter by the closed valve 31 until the accumulating liquid attains a pressure in excess of that in the conduit extension 18 of the above described predetermined amount whereupon the bellows 29 begins its collapsing movement, slowly discharging the liquid therefrom out of the conduit extension 18 and ultimately the point of balance is reached at which the valve 31 suddenly opens. Some of the accumulated liquid in the conduit extension 17 then rushes through the meter mechanism above described, operating it and registering the amount of the flow therethrough, re-supplying the bellows and conduit extension with liquid and effecting an immediate subsequent closure of the valve.

In the latter mode of operation it is preferable to provide in the system connected to the conduit extension 18 a portion of some elevation whereby to maintain the bellows full of liquid in its expanded or collapsed condition, and to provide a suitable counter-pressure against which the pressure in the conduit extension 17 may act in attaining the said balanced condition.

In the meter of Fig. 1, to insure that the valve will open before the bellows is completely collapsed, the relative tension of the springs 65 and 37—36 may be adjusted. One suitable means of adjustment is to provide a cylindrical chamber wall 22 in two parts, an upper and a lower part threadedly connected together as at 23; by screwing the upper part one way or the other, the relative tension on the springs will be changed as will be understood.

Regardless of the adjusted tension of the springs as stated, to vary the response of the valve to pressure, to cause it to open at selected pressure, when the valve 31 starts to open the port 21, it instantly moves its full stroke, which if desired, may be determined by the impact engagement of a portion of the weight 46 with the inner surface of the shoulder 35. The full stroke action is caused by providing the valve body 100 of larger diameter than the diameter of the port 21; upon the initial opening movement of the valve, the pressure which when the valve was closed acted only on the port closing portion 101 of the valve, acts upon the greater area of the valve body 100 thus suddenly increasing the valve opening pressure. The valve likewise closes instantaneously when it starts to close under the impulsion of the spring 65.

As will now be apparent, the gulper meter for registering or registering and recording liquid flow as illustrated in Fig. 1, may be connnected by means of the conduit extensions 17 and 18 in a line of flow and will accurately meter and record high rates of flow without gulping or small rates of flow with gulping. It may be employed in a conduit system in which liquid under pressure is applied to the extension 17 and liquid is withdrawn from the extension 18 to effect a difference of pressure to operate the valve, the pressure being thus applied on the approach side of the valve; or it may be employed to meter continuous flows under pressure in the extension 17, the valve remaining open at large rates of flow and gulping at small rates of flow. Thus the rate of flow may also be controlled from the approach side instead of from the discharge side as above mentioned.

The registering and recording mechanism will now be described. The shaft 48, rotated by the liquid actuated meter element 40', extends into the head 66 through a bore providing a bearing therefor and may be sealed by the packing 248 above referred to. Within the head 66 may be provided gearing to reduce the movement of the shaft 48 and to operate a registering dial mechanism, illustrated at 61 in Fig. 2. Such registering mechanisms are well known in this art and it is believed unnecessary to illustrate or describe them in detail.

A shaft 48' extending upwardly out of the head 66 is connected within the head to the reduction gearing in a manner to rotate the shaft 48' at any suitable speed or rate proportional to that of the shaft 48. By this arrangement as will be clearly understood, the nutating device 40 may be caused to actuate the shaft 48' one revolution for a predetermined quantity of water passing through the device, and the register 61 may be caused to indicate the total quantity of water which has passed through the meter.

A cam 50 is secured on the shaft 48' and a dial finger 60 on the cam moves over a circular dial scale 60' which may be inscribed on the head 66 and the dial finger 60 may thus indicate fractions of a revolution of the cam for a purpose to be described.

A reciprocatory bar 62 is mounted in bearing bores 62'—62' in the walls of the housing to guide its movement along a line intersecting the axis of the shaft 48' and at right angles thereto and carries a pair of cam followers 53—53 engaging diametrically opposite sides of the cam 50. The cam 50 has its camming surface, which engages the followers 53, formed so as to reciprocate the bar 62 by cam rotation. A heart-shaped cam is preferred to cause the bar 62 to move with a uniform rate of movement in each reciprocatory direction.

To prevent the bar 62 from rotating on its axis, its outer end is bent U-form and the legs thereof are projected through suitable bores 54—54 in a bracket 55 which may be secured to the housing of the meter by one of the bolts 13. A pen device 58 is secured to the bar 62 and reciprocates therewith. A chart of ribbon form 57 is supported upon spools 56 in a well known manner and is adapted to be fed or propelled continuously by a clock or other mechanism not illustrated but well understood to move under the pen whereby the pen may inscribe a line thereon, and whereby the line may indicate movements of the rotary shaft 48.

The ribbon may have uniformly spaced transverse lines 105—105 to indicate time intervals and may have longitudinal lines 106 indicating fractions of a shaft revolution; so that a chart made by the pen device 58 will be a record of the continuity, cessation, quantity and rate of flow of water through the meter at any period of time and over successive periods of time.

Where it is desired to indicate or record remotely from the instrument above described, the flow of water therethrough, a commutator 51 is secured upon the shaft 48' constructed from electric conducting metal and having a circumferential series of teeth or contact points 108—108, the space between which is filled with insulation compound or the like 109 formed to provide a corresponding plurality of intermediate insulation teeth 108'. A contact finger 110 is supported to resiliently engage the teeth as the commutator rotates. The finger 110 is supported upon and electrically insulated from the head 66 by an insulating bushing 111 projected laterally therethrough, the finger 110 having electric connection with a stud 112 externally of the housing to which a conducting wire 113 may be connected leading to an electro-magnetically actuated apparatus, not shown. A return wire for the apparatus is indicated at 114 connected to a battery 115 and the battery connected to the ground 116. The meter may be grounded to complete the circuit.

By this arrangement, upon each rotation of the shaft 48', a predetermined number of electric impulses will be transmitted from the meter to the electro-magnetic recording device, remotely situated from the meter, and each impulse will represent a quantity of water which has flowed through the meter.

By providing alternate conducting and non-conducting teeth 108 and 108', a quick make and a quick break action is provided, with the well known advantages. The initiation and interruption of the electric current by this arrangement is caused to occur accurately in correspondence with the rotation of the commutator.

The electro-magnetically actuated remotely situated recorder may comprise a ribbon chart 57 and a pen device, and may produce a chart such as that illustrated in Fig. 1 and described above, it being only necessary to provide in said remotely situated instrument a cam corresponding to the cam 50 and means to step it up rotationally by the said electrical impulses transmitted thereto so that the cam of said remote instrument will make one revolution for each revolution of the cam 50. Such apparatus being well understood, it is believed that further illustration and description thereof is unnecessary herein.

By the instrument above described, a record of the continuity, cessation, quantity and rate of flows of liquid occurring at any time and over successive periods of time may be recorded with an accuracy not possible heretofore. It is to be particularly noted in this connection that a record made by an ordinary meter recording the number of revolutions of an element thereof such as the nutating device 40 of the instant device would not be the same as the record of the instant device above described.

In such ordinary instrument, flow of water through the nutating device at one rate will register and record more or less than flow of water through it at another rate. In the instant device the rate of flow through the nutating device is always at the rate at which the nutating device responds accurately to flow through it. Substantially all meters of this general type are sufficiently accurate at certain high rates of flow, and if such meters of the prior art, particularly those which have recording mechanisms, were always operated at such high rates, their records would be accurate. Records made by such meters, however, at lower that a predetermined rate are correspondingly inaccurate and merely record the number of rotations of the nutator.

As will now be clear, with the instant instrument, the record will be accurate at all rates of flow from the maximum capacity of the nutator or other flow responsive actuator down to the very minimum.

A recording apparatus embodying the principles above described may be employed to record rainfall to an exceedingly high degree of accuracy from the lowest minimum to the highest maximum; and a chart made as above described may be relied upon and may be read to a very high degree of accuracy.

Obviously, one of the requirements of an accurate rainfall register or recorder must be its ability to measure accurately very small quantities of liquid. The gulper principle described above may accurately measure, by gulps, small quantities of water such as one cubic inch or less, which quantity of water may readily be accumulated in a rainfall catchment basin of small area at the very minimum of rainfall rate.

A suitable proportion of parts for a rainfall recording apparatus is to provide a catchment basin in which for each 1" of rainfall, there will be collected $\frac{1}{10}$ of a cubic foot of water, and this quantity of water flowing through the instrument may rotate the pen cam one revolution and therefore represent 1" of rainfall on the chart. The chart may be provided with five transverse spaces by lines 106, and the scale 60' may be divided into 100 divisions, each division on the scale thus representing 1/100" rainfall and each chart transverse division representing $\frac{1}{10}$" rainfall.

With a gulper meter as described of small capacity, that is to say, operating by small quantity gulps, the steps of movement of the pen device 58 become so small that the gulps are integrated into a continuous line even at the lowest rates of rainfall. The line of rainfall on the chart will thus appear to be a continuously sloped line at any rate of rainfall. When reading the chart at the time of making the record at any instant, the line on the chart may be supplemented by a reading of the scale 60', but this is not essential inasmuch, as will be readily apparent, the chart itself can be read to the nearest 1/100" even when the total width of the chart lines 106 is only ½" and it could be read even to a smaller rainfall if such were accumulated by a wider chart.

For the accurate measurement of rainfall, I prefer to arrange the meter or registering and recording mechanism and the gulping valve mechanism and an accumulating reservoir in a conduit system, four forms of which are shown in the accompanying drawings, Figs. 6 to 9 inclusive.

Figure 4:
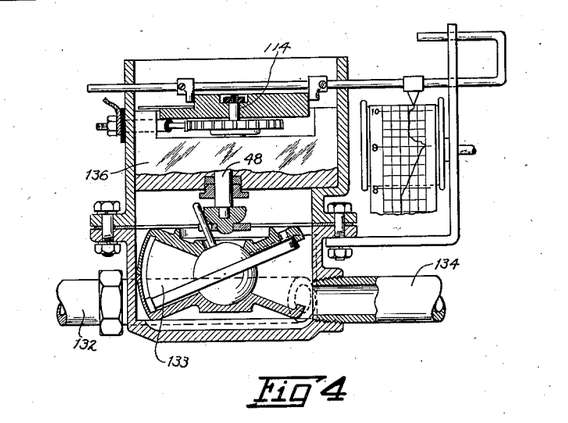
Fig. 4 is a view similar to Fig. 1 illustrating a modification.

The registering and recording mechanism is thus separate from the valve mechanism and from the reservoir. The valve and the registering and recording mechanism are shown in Figs. 5 and 4 respectively and will now be described.

Figure 5:
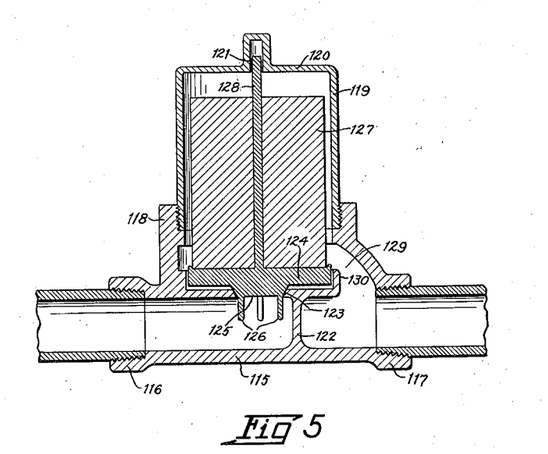
Fig. 5 is a cross-sectional view of a liquid flow controlling valve construction which I may employ in the practice of my invention.

The valve, Fig. 5, comprises a lower housing portion 115 having a threaded inlet conduit 116 and an outlet conduit 117 and an upwardly extending generally cylindrical internally threaded body portion 118, into which is threaded the lower open end of a cup-form housing extension 119 having in the bottom 120 of the cup an enclosed guide bore 121.

The two conduits 116 and 117 are separated by a partition 122 having a horizontally disposed valve port 123 therein. A valve 124 in the form of a disc has a downwardly tapering conical portion 125 adapted to seat in and seal the port 123. Depending fingers 126 guide vertical movement of the valve upon upward movement thereof to open the port. A weight 127 rests upon the disc 124 and is centered thereon by a valve stem 128 extending upwardly through a suitable bore in the weight 127 and at its upper end entering the bore 121 to further guide movement of the valve.

The conduit 117 communicates by a passageway 129 with the interior of the cup-form housing extension 119. The valve disc 124 at the periphery thereof fits with suitable clearance in an upwardly open shallow cup 130 formed on the partition 122.

In the operation of the valve above described, the weight of the valve and its supplemental weight 127 holds the valve port 123 closed normally. Upon accumulation of pressure occurring in the conduit 116, in excess of the pressure of the conduit 117, a point of pressure difference will be reached whereat the valve 124 will be raised. Immediately upon opening the port 123, the lower side of the disc 124 of the valve is subjected to the full pressure of the liquid in the port, and this increased area multiplied by the pressure causes the valve instantly to be moved upwardly opening the port wide open and permitting the water to rush, under the impulsion of the pressure, through the conduit 116, through the port 123, and through the passageway 129 into the conduit 117. Should the flow become reduced, due for example to an equalization or substantial equalization of pressure in the conduits 116 and 117, the difference of pressure on the valve 124 will be insufficient to hold it up and it will start toward the closing position, suddenly closing the port.

Referring now to the registering and/or recording mechanism of Fig. 4 which is used with the valve of Fig. 5, I have illustrated a construction which may be identical with that of Fig. 1 so far as the part in the upper housing portion 10 of Fig. 1 is concerned. In the form of Fig. 4, water is admitted through a conduit 132 and flows through a nutating device, indicated generally at 133, and out through a conduit 134. The shaft 46 as in Fig. 1 is rotated thereby and effects rotation of the shaft 114 and operation of the register and of the recording pen as described for the form of Fig. 1.

Referring now to the form of conduit system of Fig. 6, in which the valve and meter of Figs. 5 and 4 are employed, I have shown at 70 a catchment basin at the upper end of a vertical stand pipe or tube 71 communicating through an adjustable valve 73 with a horizontal conduit 84. A strainer 72 may be provided at the catchment basin and another in the valve 73 if desired. The conduit 84 joins the conduit 116 at one side of the valve of Fig. 5, illustrated generally at 135. The other conduit 117 of the valve construction 135 joins the entering conduit 132 of the meter and is indicated in Fig. 6 at 137. The meter is indicated generally at 136 and the outlet conduit 134 thereof communicates with a slight riser 76 having a downwardly directed discharge end 77.

On the approach side of the valve device 135, a branch conduit 78 extends downwardly from the conduit 84, discharging into a reservoir 79 constituting an enlarged portion of a U tube 81, containing mercury 80. The mercury normally fills the U tube 81 to the level 82. The open end of the U tube 81 constitutes a stand pipe for mercury.

Rainfall collected in the catchment basin 79 flows downwardly into the stand pipe 71 and into the conduit 84 and reservoir 79 accumulating above the mercury and causing the mercury column to rise above the level 82 in the U tube. When the reservoir has become filled, the water will rise in the stand pipe 71 and the mercury in the U tube 81. When the water has reached the level E in the column and the mercury has reached the level 75 in the tube, one balancing the other, the required operating pressure for the gulper valve 135 will be reached and it will gulp passing through it a quantity of liquid from the reservoir 79. Thereupon the level in the stand pipe will fall from a higher level such as E to a lower level such as D and the mercury in the tube from the level 75 to the level 83 whereupon the gulper valve will close again. Thus a quantity of liquid in the reservoir represented by the difference of levels 75 and 83 will first be accumulated and then discharged all at once through the valve.

When the water falls in the stand pipe 71 from the level E to the level D and the mercury from the level 75 to the level 83, the gulper valve closes again and stops the flow until another accumulation has occurred.

The valve 73 is adjusted so that it will barely permit water to pass at a rate slightly in excess of the maximum rainfall rate to be encountered; thus water never flows into the conduit 84 at a sufficiently rapid rate to maintain the gulper valve 74 open; nor can it overflow the pipe 71 and fill the basin 70. This avoids overflow of the basin and insures that the area of water surface exposed to evaporation will at all times be merely that in the small pipe 71. The pipe 71 is of very small diameter to reduce evaporation as stated, and also so that any rainfall accumulated in the pipe 71 and not discharged through the meter until the addition thereto of subsequent fall will be negligibly small; in any case it will ultimately be registered. To install the system, the reservoir and pipe may be primed with water from any source as desired.

As will now be clear, all of the rainfall accumulated in the reservoir and discharged in gulps through the valve, will be registered and recorded on the instrument 136.

By placing the highest level of the riser 76 at a suitable level with respect to the instrument 136, the level of water in the instrument may be kept below the packing 48' therein, and thus any tendency to leak may be avoided. Furthermore, leakage is avoided by the fact that the valve 135 being upon the approach side of the meter prevents the meter from being subjected to water under pressure. Any slight leakage which may occur through the valve 135 and which might thus escape at the outlet, 77, without registration, being at a rate of flow too low to be registered, can be caught in a vessel and the quantity thereof checked to refine the accuracy of the result.

I have found, however, that under the worst conditions of leakage of the valve, the leakage does not exceed 6/10 of a cubic inch in twenty-four hours or less than one gallon per year. The contents of the tube or pipe 71 when a tube 1/8" diameter is used and when it is filled to the gulping level which may be 10 feet above the meter outlet, is only 1½ cubic inches. If this should all leak out slowly through the valve and therefore not be registered between each two successive rains, or if a rainfall is so slight as to not be more than the leakage and therefore not accumulate enough to gulp, under the worst possible conditions the annual error would not be over 1" of rainfall due to this cause.

By employing a U tube form of reservoir, the pipe 81 may be made of glass and thus the operation of accumulation and discharge in gulps may be observed. Also such an arrangement cannot leak and is wear-proof and resistance-proof.

In Fig. 7 a generally similar arrangement to that of Fig. 6 is shown except that in place of the reservoir 79 and mercury U tube 81, I employ as a reservoir to collect liquid under accumulating pressure, a housing 90 generally of cylindrical form, containing a collapsible bellows 91 sealed at one end to the housing wall, and the interior thereof communicating with the atmosphere through a duct 92. The other end of the bellows is sealed upon a head 93 and normally rests upon a support or supports 94. A compression spring 95 within the bellows abuts at one end upon the housing wall and at the other upon the head 93. Interiorly of the housing and exteriorly of the bellows is a space which may contain liquid and which communicates with the conduit 84 through the conduit 78.

The mode of operation is similar to that of Fig. 6. Liquid accumulates in the housing around the bellows and under accumulating pressure which collapses the bellows and compresses the spring 95. When the critical pressure has been reached and the valve of the gulper valve 135 has opened, the spring 95 expands and discharges liquid out of the reservoir housing 90 into the conduit 84 and through the meter 136, as will be understood. By providing the spring 95 with initial tension, the bellows will cause accumulation of liquid to begin, and discharge of liquid to cease, at a predetermined minimum pressure when this is desirable, to limit the amount of water discharged at each gulp of the gulper valve.

In Fig. 7 I have shown the meter 136 without the recording strip indicated diagrammatically thereon; and as such simplified construction shows, the meter may be used as a registering meter only or as a recording meter as of Fig. 6.

In the conduit systems of Figs. 6 and 7 as will now be apparent, the rate at which pressure accumulates on the approach side of the valve and the rate of flow into the reservoir is controlled by a valve such as the valve 73 on the approach side of the gulper valve 135, the discharge side for example at 77 in Fig. 6 being open to atmospheric pressure. In some cases of measuring and recording small rates of flow including the measuring and recording of rainfall, it is desirable to control the rate of flow at the discharge side of the valve. Two such arrangements are shown in Figs. 8 and 9, where a valve 98 is provided to control the flow. In these figures the valve 73 is also shown and may be used or may be omitted.

Particularly in instances where the supply of liquid is from a source continually under relatively great pressure, the arrangements of Figs. 6 and 7 without the valve on the discharge side would cause the valve at 135 to be constantly subjected to great approach pressure; and where a column of mercury such as shown in Fig. 6 is employed, there would be necessary a relatively high column 81 and relatively large quantity of mercury.

In such cases, the forms of Figs. 8 and 9 are preferable. In the form of Fig. 8, the leg 141 of the U tube form of reservoir is connected to the conduit 84 on the discharge side of the valve 135 and meter 136, for example as at 138, so that the valve is subjected only to a relatively small difference of liquid pressure on the two sides thereof and the mercury column is required to indicate only this difference of pressure.

Such arrangement is suitable for rainfall registering and recording but may also be used for registering and recording flow from other sources, for example where the flow is controlled by a discharge valve such as the valve 98 and where, at least some of the time, the rate of flow is very small or at least below the accurate registering rate of the meter 136.

Referring now to Fig. 8, the conduit 78 leading from the conduit 84 communicates with a reservoir 139 in an enlarged chamber portion 140 of a U-form conduit system illustrated generally at 141. A tube 142 communicating with the lower portion of the chamber 140 bends upwardly as at 143 and joins an enlarged portion 144 of the U conduit 142 at a lower portion thereof, and at the upper portion a conduit 145 joins the conduit 84 at 138 as described.

A suitable quantity of mercury is put into the U-form conduit 141. A valve seat 146 is provided at the lower portion of the chamber 140 and a float ball 147 is disposed adjacent thereto, normally held from floating upwardly by a pin 148, and adapted to move downwardly with the descending mercury 149 in the chamber to seal the seat 146 and prevent the mercury from falling below a predetermined level.

The chamber 144 has a similar valve seat 150, pin 151 and float ball valve 152.

At the upper end of the chamber 144, another valve seat 153, pin 154 and ball 155 are provided.

The ball 147 insures that there will be no further movement of mercury downwardly out of the chamber 140 when the ball 147 seats upon the valve seat 146. Ball 155 similarly prevents mercury from being blown over into the conduit 145 from the chamber 144. Thus balls 147 and 155 perform a similar function and either or both may be employed. In cases where the valve 98 is operated to cause relatively large flows sufficient to hold the gulper valve 135 continuously open, the mercury 149 would be subjected continuously to the approach pressure on one side and greatly reduced pressure on the other side which would tend to force the mercury out of the conduit 141 and into the overflow and the balls 147 and 155, either or both of them, when employed will prevent this.

Upon opening the valve 98 to effect a small rate of discharge flow, the pressure on the discharge side will thereby be reduced and liquid will flow into the chamber 139 due to the excess of pressure on the approach side. As the mercury is thus forced over into the riser portion of the U-form conduit and is elevated in the chamber 144, the pressure accumulates on the approach side of the valve 135.

The parts are adjusted initially so that by the time the gulping pressure has been reached on the valve 135, the mercury in the chamber 140 will reach a predeterminetd low level, for example that at 156, and the mercury in the chamber 144 will reach a corresponding high level 157. The gulper valve 135 will then open and the reservoir will discharge therethrough and through the meter 136, that portion of the liquid which does not flow through the valve 98 flowing into the upper part of the chamber 144. The mercury rises in the chamber 140 to a level 159 and falls in the chamber 144 to a level 158, the latter level being above the level at which the ball 152 closes the valve seat 150. The gulper valve then again closes and thereafter flow through the valve 98 is supplied from the chamber 144, which liquid, as will now be clear, has already been measured and recorded. Thus it is not absolutely essential to employ a ball 152 and valve seat 150, but if desired it may be employed to limit the gulping reservoir capacity, that is, the amount of liquid gulped through the valve and meter at each gulp.

The small head 158—159 maintains the flow through the gulper valve up to the time of its closing.

In the form of conduit system illustrated in Fig. 9, a mode of operation generally similar to that of Fig. 8 is had. In this form, a reservoir generally similar to that of Fig. 7 is employed, i. e. of the collapsing bellows type, but in this form the interior of the bellows 91, instead of communicating with the atmosphere through the housing wall, communicates with a conduit 97 joining the conduit 84 on the discharge side of the meter 136; and again, the discharge flow controlling valve 98 is provided beyond the juncture of the conduits 97 and 84.

It will be observed that in all of the conduit systems above described, the accumulation of liquid and the operation of the gulper valve to discharge the same through the meter is controlled solely by interacting pressure relations in the conduit system without the necessity of auxiliary mechanical means, moving mechanism, etc. Also, these systems and apparatus make possible the measurement of small rates of flow by gulps of small volume. Furthermore, these arrangements provide for a predetermined minimum rate of discharge of the reservoir through the valve and meter by maintaining a predetermined minimum difference of pressure right up to at the time of closing of the gulper valve; in the forms employing the collapsible bellows, this being determined by an initial tension of the spring 95; and in the form of the mercury U tube, this pressure difference being determined by a suitably assigned difference of levels such as 158—159 in Fig. 8. In the latter case, and independently of the closing of the valve, the level 158—159 may be positively determined by disposing the ball 152 and seat 150 so that discharge from the chamber 144 will positively be stopped when a predetermined level difference still exists.

Although I have illustrated the mercury tube form of reservoir in Fig. 6 without ball valves therein, it is to be understood, of course, that such balls and valve seats may be employed at the lower part of the reservoir 79 and in the riser portion of the U tube 81 as employed in the form of Fig. 8.

Whereas in the conduit systems illustrated I have shown the valve 135 as disposed upon the approach side of the meter 136, it will be understood that it may be employed upon the other side of the meter 136 as illustrated in broken lines at 135'.

In Fig. 1 I have illustrated the registering and recording meter in a single structure with a gulper valve and reservoir. In Figs. 5 and 4, I have illustrated one form of valve and meter in separate structures which may be used as above described in the conduit systems of Figs. 6 to 9 inclusive. It will be obvious, therefore, that if desired a single structure may be employed embodying therein a registering and/or recording meter and a gulper valve, for use in the conduit systems illustrated, the reservoir for the valve being as illustrated in the conduit system Figures 6 to 9. In other words, the gulper valve 135 and the meter 136 may be combined in a single structure and it is believed that such a structure will be clear without further illustration or description in view of the structures herein illustrated and described.

Again, whereas I have illustrated a gulper valve of the type opening in the direction of flow therethrough, it will be understood that any known or suitable construction of valve may be employed having the gulper principle, some of which may be found in the prior art of this subject matter.

My invention is not limited to the exact details of construction illustrated and described. Changes and modifications may be made within the spirit of my invention and without sacrificing its advantages and within the scope of the appended claims.

I claim:

1. In an apparatus of the class described, a liquid conduit means adapted to be connected to a source of liquid supply under accumulating pressure head, a valve normally closing the conduit means against flow, and adapted to be opened by liquid pressure in the conduit means above a predetermined value, means for closing the valve and holding it closed at pressure below the predetermined value, reservoir means communicating with the conduit means, and adapted to yieldingly accumulate liquid and to communicate a correspondingly increasing pressure head to the liquid in the conduit means, whereby upon attainment of a predetermined quantity of liquid under predetermined accumulated pressure head, the pressure may open the valve and the quantity of liquid in the reservoir may flow through the conduit means, and the pressure head may thereby be reduced permitting the valve to be closed.

2. In a liquid metering apparatus for accurately measuring relatively slowly accumulating quantities of liquid, means for collecting the liquid with an increasing hydraulic pressure head, liquid flow conduit means supplied by liquid from the collecting means subjected to the increasing pressure head, a liquid flow metering device in the line of flow of the conduit means, a valve normally closing the conduit means, subjected to the accumulating liquid pressure on the approach side and to a reduced liquid pressure on the discharge side, and the valve operable to be opened by liquid pressure upon the attainment of a predetermined excess of liquid pressure on the approach side, a liquid storage reservoir communicating with the conduit means on the approach side of the valve, and adapted to collect liquid commensurably with the increase of hydraulic head and comprising cumulative counter-pressure means balancing the pressure effected in the reservoir by the head, whereby upon attainment of excess pressure above a predetermined amount, the valve may open and effect a rush of liquid through the metering device from the storage reservoir and through the valve, reducing the pressure head and effecting closure of the valve.

3. In a metering apparatus for accurately measuring rainfall, means for collecting the rainfall with an increasing hydraulic pressure head, water flow conduit means supplied by water from the collecting means and subjected to the increasing pressure head, flow restricting means limiting the flow of water into the conduit means to a rate slightly in excess of the maximum rainfall flow rate, a water flow metering device in the conduit means, a valve normally closing the conduit means and subjected to the accumulating pressure on the approach side and to a reduced pressure on the discharge side, and the valve being operable to open upon the attainment of a predetermined excess pressure on the approach side, a water storage reservoir communicating with the conduit means on the approach side of the valve and adapted to collect water commensurably with the increase of hydraulic head and comprising cumulative counter-pressure means balancing the pressure effected in the reservoir by the head, whereby upon attainment of excess pressure above a predetermined amount occasioned by a predetermined amount of rainfall, the valve may open and effect a rush of water through the metering device from the storage reservoir and through the valve, thereby reducing the pressure head and effecting closure of the valve.

4. In a liquid metering apparatus for accurately measuring relatively slowly accumulating quantities of liquid, means for collecting the liquid with an increasing hydraulic pressure head, liquid flow conduit means supplied by liquid from the collecting means subjected to the increasing pressure head, a liquid flow metering device in the line of flow of the conduit, a valve normally closing the conduit means subjected to the accumulating liquid pressure on the approach side of the valve and to a reduced liquid pressure on the discharge side, the valve being operable to be opened by liquid pressure upon attainment of a predetermined excess of liquid pressure on the approach side, a liquid storage reservoir communicating with the conduit means on the approach side and on the discharge side of the valve and adapted to collect liquid commensurably with the increase of hydraulic head and comprising cumulative counter-pressure means balancing the pressure effected in the reservoir by the head, whereby upon attainment of excess liquid pressure above a predetermined amount, the valve may be opened and effect a rush of liquid through the metering device from the storage reservoir and through the valve, reducing the pressure head and effecting closure of the valve.

5. In a metering apparatus for accurately measuring rainfall, means for collecting the rainfall with an increasing hydraulic pressure head, water flow conduit means supplied by water from the collecting means and subjected to the increasing pressure head, a water flow metering device in the conduit means, a valve normally closing the conduit means and subjected to the accumulating liquid pressure on the approach side, flow restricting means associated with the conduit means on the discharge side of the valve creating a reduced pressure on the discharge side of the valve, the valve being operable to be opened by liquid pressure upon the attainment of a predetermined excess liquid pressure on the approach side, a water storage reservoir communicating with the conduit means on the approach side and on the discharge side of the valve and adapted to collect water commensurably with the increase of hydraulic head and comprising cumulative counter-pressure means balancing the pressure effected in the reservoir by the head, whereby upon attainment of excess liquid pressure above a predetermined amount occasioned by a predetermined amount of rainfall the valve may be opened by liquid pressure and effect a rush of water through the metering device from the storage reservoir and through the valve, thereby reducing the pressure head and effecting closure of the valve.

6. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure on the approach side of the valve in excess, by a predetermined amount, of pressure on the discharge side, and responsive to close at a predetermined minimum flow rate, the reservoir comprising means for yieldingly accumulating liquid from the source at variable flow rates and at a correspondingly increasing reservoir pressure, the reservoir communicating with the conduit means at a point on the approach side of the gulper valve and adapted to discharge its contents through the conduit means and gulper valve upon attainment of a predetermined high reservoir pressure with an accompanying reduction of reservoir pressure, and a flow registering means actuable by flow through the valve.

7. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure when the pressure on the approach side of the valve exceeds, by a predetermined amount, the liquid pressure on the discharge side, and operable to close at a predetermined minimum flow rate, the reservoir comprising a chamber and a supplemental conduit means effecting communication from the chamber to the said conduit means at a point on the approach side of the valve and the chamber having means yieldingly increasingly opposing entrance of liquid thereinto through the supplemental conduit means, the reservoir adapted to discharge its contents through the supplemental conduit means and through the conduit means and gulper valve upon attainment of a predetermined high reservoir pressure with an accompanying reduction of reservoir pressure, and a flow registering means actuable by flow through the valve.

8. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to open and close at predetermined high and low pressures on the approach side thereof, the reservoir comprising a chamber, a supplemental conduit means effecting communication from the chamber to the said conduit means at a point on the approach side of the valve, a U tube communicating with the chamber and a quantity of relatively heavy liquid in the U tube yieldingly increasingly opposing entrance of liquid into the chamber through the supplemental conduit means and causing liquid in the chamber to be discharged through the conduit means and gulper valve upon attainment of a predetermined high pressure with an accompanying reduction of reservoir pressure, and a flow registering means actuable by flow through the valve.

9. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened and closed respectively by liquid pressure on the approach side of the valve in excess, by a predetermined amount, of pressure on the discharge side, and by reduction of flow rate to a predetermined minimum, the reservoir comprising a collapsible and expansible chamber, a supplemental conduit effecting communication from the chamber to the said conduit means at a point on the approach side of the valve, and resilient means associated with the chamber tending to collapse it and yieldingly increasing the opposing entrance of liquid thereinto through the supplemental conduit means, and adapted to discharge the chamber liquid contents through the conduit means and gulper valve upon attainment of a predetermined high reservoir pressure with an accompanying reduction of reservoir pressure, and a flow registering means actuable by flow through the valve.

10. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure upon attainment of approach pressure in excess, by a predetermined amount, of pressure on the discharge side of the valve and adapted to close at a predetermined minimum flow rate, the reservoir comprising means for yieldingly accumulating liquid from the source at variable flow rates and at a correspondingly increasing reservoir pressure, the reservoir communicating with the conduit means at points on both the approach and discharge sides of the valve and adapted to discharge its contents through the conduit means and gulper valve upon attainment of a predetermined high reservoir pressure with an accompanying reduction of reservoir pressure, and a flow registering means actuable by flow through the valve.

11. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to remain closed at approach side pressures below a predetermined minimum and to be opened by liquid pressure on the approach side of the valve in excess, by a predetermined amount, of pressure on the discharge side, and responsive to close at a predetermined minimum flow rate, the reservoir comprising chamber means, a first and second supplemental conduit means effecting communication from the chamber means to said conduit means at points on the approach and discharge sides respectively of the valve, and the chamber means comprising means yieldingly increasingly opposing entrance of accumulating liquid thereinto through the first supplemental conduit means from the source and concurrently supplying liquid to the conduit means through the second supplemental conduit means, the chamber means adapted to discharge accumulated content through the first supplemental conduit means and gulper valve upon attainment of a predetermined high reservoir pressure with an accompanying reduction of reservoir pressure and intake of liquid into the chamber means from the conduit means through the second supplemental conduit means, and a flow registering means actuable by flow through the valve.

12. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to open and close at predetermined high and low pressures on the approach side thereof, the reservoir comprising a chamber, a supplemental conduit means effecting communication from the chamber to the said conduit means at a point on the approach side of the valve, a U tube communicating with the chamber at one end and open to atmosphere at the other end, and a quantity of relatively heavy liquid in the U tube yieldingly increasingly opposing entrance of liquid into the chamber through the supplemental conduit means and causing liquid in the chamber to be discharged through the conduit means and gulper valve upon attainment of a predetermined high pressure with an accompanying reduction of reservoir pressure, and a flow registering means actuable by flow through the valve.

13. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure on the approach side of the valve in excess, by a predetermined amount, or pressure on the discharge side, and responsive to remain open at flow rates above a predetermined minimum, and to close at flow rates below the predetermined minimum, the reservoir comprising means for yieldingly accumulating liquid from the source at variable flow rates and at a correspondingly increasing reservoir pressure, the reservoir communicating with the conduit means at a point on the approach side of the gulper valve and adapted to discharge its contents through the conduit means and gulper valve upon attainment of a predetermined high reservoir pressure with an accompanying reduction of reservoir pressure, and the reservoir comprising means to effect yielding thereof to accumulate liquid therein only at source pressure above a predetermined minimum, and a flow registering means actuable by flow through the valve.

14. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure on the approach side of the valve in excess, by a predetermined amount, of pressure on the discharge side, the reservoir comprising means for yieldingly accumulating liquid from the source at variable flow rates and at a correspondingly increasing reservoir pressure, the reservoir communicating with the conduit means at a point on the approach side of the gulper valve and the reservoir adapted to discharge its contents through the conduit means and gulper valve upon attainment of a predetermined high reservoir pressure with an accompanying reduction of reservoir pressure, and the reservoir being provided with means rendering it yieldable to accumulate liquid at pressure above a predetermined minimum only, and a flow registering means actuable by flow through the valve.

15. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure on the approach side of the valve in excess, by a predetermined amount, of pressure on the discharge side, and responsive to close at a predetermined minimum flow rate, the reservoir comprising means for yieldingly accumulating liquid from the source at variable flow rates and at a correspondingly increasing reservoir pressure, the reservoir communicating with the conduit means at a point on the approach side of the gulper valve and adapted to discharge its contents through the conduit means and gulper valve upon attainment of a predetermined high reservoir pressure with an accompanying reduction of reservoir pressure, the reservoir being of predetermined limited capacity to prevent accumulation of liquid and rise of reservoir pressure above a predetermined maximum, and a flow registering means actuable by flow through the valve.

16. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to be opened by liquid pressure on the approach side of the valve in excess, by a predetermined amount, of pressure on the discharge side, the reservoir comprising a collapsible chamber and a spring opposing collapse to effect yielding accumulation of liquid from the source at variable flow rates, and at a correspondingly increasing reservoir pressure, the reservoir communicating with the conduit means at a point on the approach side of the gulper valve and adapted to discharge its contents through the conduit means to the gulper valve upon attainment of a predetermined high reservoir pressure with an accompanying reduction of reservoir pressure and the spring being provided with initial tension to oppose collapse of the chamber except at source pressure above a predetermined minimum.

17. In an apparatus of the class described, a liquid conduit means adapted to be connected to a liquid source supplying liquid at varying rates of flow under pressure, gulper valve means and a reservoir associated with the conduit means for causing the supplied liquid to flow through the valve at rates above a predetermined minimum rate only, the valve being responsive to open and close at predetermined high and low pressures on the approach side thereof, the reservoir being in the form of a U tube communicating with the conduit means at the approach and discharge sides of the valve, the U tube containing a quantity of relatively heavy liquid, whereby the U tube may yieldingly accumulate liquid from the source at variable flow rates and at a correspondingly increasing reservoir pressure, the reservoir adapted to discharge its contents through the conduit means and gulper valve upon attainment of a predetermined high reservoir pressure with an accompanying reduction of reservoir pressure and automatic valve means preventing complete balance of liquid in the two legs of the U tube upon discharge of accumulated contents to prevent reduction of pressure and corresponding displacement of accumulated liquid by the relatively heavy liquid beyond predetermined minima.

18. In a liquid metering gulper construction, a housing, a partition in the housing provided with a valve port, a valve normally closing the port, a chamber of the collapsible bellows type in the housing, an approach conduit means adapted to be connected to a source of liquid under pressure communicating with the housing interior and with the bellows exterior, and communicating with the approach side of the valve port through a flow operable element of a flow metering mechanism, a discharge conduit means communicating with the discharge side of the port and with the bellows interior, a spring opposing opening movement of the valve at a difference of approach and discharge pressures below a predetermined value and a spring opposing collapsing of the chamber at a pressure difference below a lower predetermined value, the bellows being adapted to gradually collapse and supply low rates of flow to the discharge conduit and upon opening of the valve adapted to expand and fill with liquid flowing through the opened port.

GEORGE GOODELL EARL.